(12) United States Patent
Bruns (10) Patent No.: US 12,415,450 B2
(45) Date of Patent: Sep. 16, 2025

(54) VEHICLE SEAT AND A FRAME THEREOF

(71) Applicant: Bruns Holding GmbH & Co. KG, Apen (DE)

(72) Inventor: Gerit Bruns, Bad Zwischenahn (DE)

(73) Assignee: Bruns Holding Gmbh & Co. KG, Apen (DE)

( * ) Notice: Subject to any disclaimer, the term of this patent is extended or adjusted under 35 U.S.C. 154(b) by 0 days.

(21) Appl. No.: 18/077,566

(22) Filed: Dec. 8, 2022

(65) Prior Publication Data

US 2024/0025315 A1 Jan. 25, 2024

(30) Foreign Application Priority Data

Jul. 22, 2022 (DE) .......................... 202022104164.4

(51) Int. Cl.
*B60N 2/68* (2006.01)
*B60N 2/10* (2006.01)

(52) U.S. Cl.
CPC .............. *B60N 2/682* (2013.01); *B60N 2/10* (2013.01); *B60N 2/68* (2013.01)

(58) Field of Classification Search
CPC .................................. B60N 2/68; B60N 2/682
See application file for complete search history.

(56) References Cited

U.S. PATENT DOCUMENTS

| | | | |
|---|---|---|---|
| 4,874,203 A | 10/1989 | Henley | |
| 5,660,443 A * | 8/1997 | Pedronno | B60N 2/682 297/452.2 X |
| 5,685,614 A * | 11/1997 | Chabanne | B60N 2/682 297/452.2 X |
| 9,950,796 B2 * | 4/2018 | Guttropf | B64D 11/0648 |
| 10,857,906 B2 * | 12/2020 | Jameson | B60N 2/682 |
| 10,889,216 B2 * | 1/2021 | Inoue | B60N 2/686 |
| 11,352,144 B2 * | 6/2022 | Murnan | B60N 2/682 |
| 11,518,281 B2 * | 12/2022 | Mansouri | B60N 2/68 |
| 11,584,274 B1 * | 2/2023 | Mansouri | B60N 2/42 |
| 12,187,174 B2 * | 1/2025 | Mansouri | B60N 2/753 |
| 2010/0148547 A1 | 6/2010 | Marriott et al. | |
| 2012/0098322 A1 * | 4/2012 | Muller | B60N 2/68 297/452.18 X |
| 2013/0113257 A1 * | 5/2013 | Line | B60N 2/0715 297/344.13 |

(Continued)

FOREIGN PATENT DOCUMENTS

| | | |
|---|---|---|
| DE | 29816819 U1 | 12/1998 |
| DE | 202007006256 U1 | 7/2007 |

(Continued)

OTHER PUBLICATIONS

German Patent Office, Search Report issued in 20 2022 104 164.4, dated Mar. 14, 2023, with English Translation (7 pages).

(Continued)

*Primary Examiner* — Rodney B White
(74) *Attorney, Agent, or Firm* — Wood Herron & Evans LLP (57) ABSTRACT

A frame for a vehicle seat is provided, in particular for a vehicle seat for people with a disability. The frame is made of aluminum or an aluminum alloy. A substructure for receiving the frame is also provided, in particular for reversibly releasably coupling to a vehicle structure, with the substructure being made at least partially or completely of aluminum or an aluminum alloy.

17 Claims, 7 Drawing Sheets

(56) References Cited

U.S. PATENT DOCUMENTS

| | | | |
|---|---|---|---|
| 2016/0176316 A1 | 6/2016 | Kosuge et al. | |
| 2017/0313226 A1* | 11/2017 | Akaike | B60N 2/682 |
| 2018/0264979 A1* | 9/2018 | Lasell | B60N 2/4249 |
| 2024/0034210 A1* | 2/2024 | Tranier | B64D 11/0638 |

FOREIGN PATENT DOCUMENTS

| | | | | |
|---|---|---|---|---|
| DE | 202006007562 U1 | | 9/2007 | |
| DE | 102008042325 A1 | * | 4/2010 | B60N 2/68 |
| DE | 202008017621 U1 | * | 9/2010 | B60N 2/68 |
| DE | 102014211877 A1 | | 12/2014 | |
| EP | 0745508 A2 | | 12/1996 | |
| EP | 2556991 A1 | | 2/2013 | |
| EP | 2358561 B1 | | 12/2016 | |
| FR | 1461600 A | | 2/1966 | |
| JP | H10236193 A | | 9/1998 | |
| JP | 2015101286 A | | 6/2015 | |

OTHER PUBLICATIONS

European Patent Office, Partial Search Report issued in 23187329.0-1012 dated Jan. 5, 2024, with English Translation (32 pages).
European Patent Office, Written Opinion, issued in EP 23187329.0 dated Aug. 1, 2015 (12 pages), with English translation.

* cited by examiner

VEHICLE SEAT AND A FRAME THEREOF

CROSS-REFERENCE TO RELATED APPLICATION

This application claims priority to German Application No. 20 2022 104 164.4, filed Jul. 22, 2022. The above-mentioned patent application is incorporated herein by reference in its entirety.

TECHNICAL FIELD

This application relates to a frame for a vehicle seat, in particular for a vehicle seat for people with a disability. This application also relates to a substructure for receiving a frame for a vehicle seat and for reversibly releasably coupling to a vehicle structure, and to a vehicle seat for the transport of persons.

BACKGROUND

Vehicle seats for motor vehicles, i.e., for land vehicles moved by machine power, are subject to strictly defined requirements in order to comply reliably with the safety regulations relating to the transport of persons. The aim, in particular, besides that of transporting passengers comfortably, is to reduce the weight of the frame that forms the basis for the strength of the vehicle seat, and hence also to minimize the total weight of the vehicle seat and of the motor vehicle fitted with such a vehicle seat. At the same time, such a vehicle seat must continue to meet the safety requirements applying to it.

Thus, it would be desirable to present a frame for a vehicle seat, a substructure for a vehicle seat, and a vehicle seat, by which a reliable compromise is provided between a low weight with sufficiently high strength and increasingly tough safety requirements.

SUMMARY

These and other technical objects and problems are addressed by the embodiments provided in this invention. To this end, a frame for a vehicle seat is provided in accordance with various embodiments of the invention, in particular for a vehicle seat for people with a disability. The frame is made, in particular, of aluminum or an aluminum alloy. By using aluminum or an aluminum alloy to form the frame, in particular the entire frame, that stiffens the vehicle seat, it is possible to reduce the weight of the frame. This increases the remaining payload of a vehicle, and such a frame having a reduced weight allows the vehicle to be operated more energy-efficiently. At the same time, the use of aluminum or an aluminum alloy has the advantage that the frame has high strength despite its reduced weight, which means that the safety requirements applying to such a frame can be met. Such a frame is preferably used in a vehicle seat of a motor vehicle. An aluminum-magnesium alloy, for example, in particular ALMG 6082, is used to form the frame.

In a preferred development of the invention, the frame has a seat section and a seat back section, the seat section being rigidly or parts thereof being movably connected to the seat back section. Due to the rigid connection between seat back section and the seat section, the frame has greater strength in the connection region, so forces acting on the seat back section, for example, can be safely absorbed and transferred to a vehicle structure that bears the weight of the seat. In one possible embodiment, at least parts of the seat section are movable in relation to the seat back section and thus in relation to the frame. If a seat is not needed, it can preferably be reduced in size, thus providing more space in the vehicle. In this case, the seat section of the frame substantially defines the part of the vehicle seat that forms the seat area with its seat surface. The seat back section of the frame corresponds substantially to the part of the vehicle seat that forms the seat back of the vehicle seat. The seat section and the seat back section may be fastened together, for example, to provide a rigid connection in their connection region.

According to a development of the invention, the frame has a fastening section for fastening to a substructure, wherein the seat back section is formed integrally with the fastening section. This further improves the structural integrity of the frame in those regions where the greatest forces act in an accident situation, thus allowing it to absorb significantly greater forces in comparison with a multi-part frame. In order for the force-absorbing frame parts to be of one piece, the seat back section and at least the fastening section of the frame, and in one possible embodiment the seat section also, are preferably connected to each other in a material fit, in particular by welding them to each other. In one preferred embodiment, the seat section and the seat back section are themselves integral and in one piece, the join between the structural parts forming the frame sections preferably being based on a material-fit connection.

The expression "integral" is also to be understood here to mean that the frame is formed from a plurality of different profile members or structural parts which are joined together in such a way that they cannot be separated non-destructively once the frame has been produced.

According to one possible embodiment, the seat back section has two supporting side members arranged at a distance from each other and defining the width of the seat back section. The seat back section of the frame is formed substantially of the two supporting side members arranged at a distance from each other. The distance between the supporting side members defines the width of the seat back section. The length of the supporting side members defines the length and height of the seat back section. The distance between the supporting side members of the seat back section ranges from about 300 mm to about 450 mm. The length of the supporting side members ranges from about 650 mm to about 800 mm.

In one preferred embodiment, the supporting side members extend obliquely to each other, wherein the distance between them decreases toward their upper end. Due to the supporting side members extending obliquely to each other, the strength and structural integrity of the seat back section and of the frame formed therefrom in accordance with the invention are further improved. The seat back section of the frame according to the invention tapers in width toward its top end from the connection region with the seat area. In one preferred embodiment of the frame according to the invention, the supporting side members extend at an angle of 3 to 8 degrees, preferably at an angle of about 5 degrees, to each other.

According to a development of the invention, the seat section has two load-bearing side members arranged at a distance from each other and defining the width of the seat section. With the aid of the load-bearing side members, the seat section of the frame according to the invention obtains the desired strength and structural integrity. The distance between the load-bearing side members is decisive for the width of the seat section of the frame. The length of the load-bearing side members defines, in particular, the depth of the seat section and is therefore decisive for the seating comfort of the seat area forming the seat surface on the vehicle seat according to the invention. The distance between the load-bearing side members of the seat section ranges from about 350 mm to about 450 mm. The length of the load-bearing side members ranges from about 200 mm to about 400 mm.

According to a preferred embodiment, the load-bearing side members of the seat section extend substantially parallel to each other. In particular, the frame has a constant width in the depth direction of its seat section. The width of the seat section is preferably the same as the width of the seat back section at its bottom end. To form the rigid connection between the seat section and the seat back section, portions of the load-bearing side members are connected directly to respective corresponding portions of the supporting side members. More particularly, the ends of the load-bearing side members are butt-jointed to end sections of a longitudinal side of the supporting side members. The ratio of the length of the load-bearing side members and thus of the seat section to the distance between the two load-bearing side members ranges from 0.4 to 0.9.

According to a development of the invention, the supporting side members and the load-bearing side members have longitudinal axes that are at an angle of about 100 degrees to about 115 degrees to each other. The load-bearing side members and the respective supporting side members connected thereto are at an obtuse angle to each other, thus providing seating comfort to a vehicle seat fitted with such a frame according to the invention, despite the inclination of its seat back section being invariable relative to the seat area. Orienting the seat back section within the specified angular range relative to the seat section of the frame allows a passenger being transported with such a vehicle seat to adopt a comfortable sitting posture even on longer trips.

The longitudinal axis of the load-bearing side member is preferably substantially horizontal when the vehicle seat is in operation. In particular, when the vehicle seat is in operation the load-bearing side members of the frame, or their longitudinal axes, extend parallel to a vehicle structure that receives the vehicle seat. Thus, the seat back section preferably has an identical orientation, relative to the vehicle structure forming a floor of the vehicle and holding the vehicle seat, to that of the load-bearing side members themselves. A person thus adopts a comfortable sitting position inside the vehicle also.

In one possible embodiment, the seat section additionally has load-bearing cross-members extending transversely to and between the load-bearing side members to form the fastening section. With the aid of the load-bearing cross-members, the load-bearing side members are fixed in a simple manner in their predetermined orientation relative to each other and/or distance from each other. By the load-bearing cross-members, the frame according to the invention can be easily mounted on a substructure that receives the frame. In this embodiment, the load-bearing cross-members serve as a fastening section for fastening the frame to a substructure that bears the frame. In one possible embodiment of the frame, at least one of the load-bearing cross-members connecting the load-bearing side members to each other is at least partially connected to a portion of the supporting side members forming the seat back section. The load-bearing cross-members extending transversely to the load-bearing side members are preferably welded at their ends to a respective associated load-bearing side member or supporting side member. The strength of the frame according to the invention is thus improved still further.

The seat section is preferably movable, in particular pivotable, relative to the fastening section. Especially when a seat with such a frame according to the frame is not in use, the seat section of the seat can be moved relative to the fastening section and thus to the seat back section rigidly connected to the fastening section. The amount of available space in the vehicle can be adapted, in particular increased, as the need arises and the load capacity of a vehicle can be put to better use to transport bulky objects when a vehicle seat is not needed. A pivot bearing is preferably formed along a portion of each load-bearing side member so that the seat section is designed to be movable. The pivot bearings are disposed, in particular, at the ends of a respective load-bearing side member facing the fastening section and the seat back section.

According to a preferred embodiment, the seat section has connecting cross-members that connect the ends of the load-bearing side members to each other. The connecting cross-members connecting the load-bearing side members give the seat section its desired strength and stiffness. This prevents the side members and cross-members from twisting in relation to each other. An approximately rectangular frame part for the seat section is preferably formed with the aid of the load-bearing side members and the connecting cross-members. By providing the pivot bearing at a respective end portion of the load-bearing side members, a pivot axis extending parallel to the connecting cross-members is preferably created. The seat section is preferably received pivotably on the fastening section in such a way that the load-bearing side members of the seat section extend approximately parallel to the supporting side members of the seat back section when the seat section is in its folded-up position.

In a preferred development of the invention, the supporting side members of the seat back section extend over the entire height of the frame, and each supporting side member is connected at its lower end region along a longitudinal side to a first end of a load-bearing side member. An improved structural strength of the frame is the overall result of the supporting side members extending over the entire height of the frame according to the invention and the connection being formed between the supporting side member and the ends of the load-bearing side members abutting it in a butt joint along a longitudinal side. A force acting on the frame or portions of the frame can be better counteracted accordingly. Any forces acting on the frame of the vehicle seat in an accident situation can be safely transferred from the seat back section, for example, in particular from the supporting side members, toward the load-bearing side members and further on from the load-bearing side members into the load-bearing cross-members that couple the frame in operation to a substructure, without the forces acting on the frame exceeding the permissible total load.

In the preferred embodiment described here, the end face of the load-bearing side member abuts a longitudinal side at the bottom end of a respective associated supporting side member. The end face of the load-bearing side member and the longitudinal side of the load-bearing side member are connected to each other in a material fit, in particular by welding them together.

According to a preferred embodiment of the invention, the supporting side members, the load-bearing side members and/or the load-bearing cross-members are each formed from extruded profiles. Providing extruded profiles allows the structural parts that substantially form the frame to be manufactured in a simple manner. Such profiles can be continuously produced, and in many cases the individual parts of the frame consisting of such an extruded profile can be produced by simply cutting them to length. Making the supporting side members, the load-bearing side members and/or the load-bearing cross-members out of an extruded aluminum profile also allows subsequent processing, for example machining of the profiles, to be simplified.

The supporting side members and/or load-bearing side members, at least, have preferably at least one stiffening web extending inside the profile to form a multi-chamber profile. Providing such a stiffening web further improves the strength and the resistance of the supporting side member and/or load-bearing side member against a force acting externally on the profile. A profile equipped with such a stiffening web has significantly greater dimensional stability in the event of a force acting on the profile. In the longitudinal direction of the profile, at least one stiffening web, preferably two such stiffening webs, extends inside the load-bearing side member of the seat back section and of the load-bearing side member of the seat section, respectively. A plurality of chambers arranged parallel to one another are provided inside the supporting side members and/or load-bearing side members embodied as extruded profiles, which further simplifies their manufacture as extruded profiles.

According to a development of the frame, a rotary bearing is disposed on the fastening section, by which the frame is movable about a rotational axis extending parallel to the supporting side members, and wherein the fastening section is preferably designed as a coupling point for fastening the frame to the substructure. With the aid of the rotary bearing disposed on the fastening section, in particular on the underside of the fastening section, it is possible to bring the seat frame and thus a seat pan accommodating the person into different orientations relative to a substructure that bears the frame. The seat pan can thus be moved into a different orientation relative to a normal position of the seat facing in the direction of travel.

The rotary bearing is preferably designed with at least two bearing parts that are movable relative to each other, in particular an inner bearing part and an outer bearing part. The inner bearing part is preferably fastened to the frame, and the outer bearing part is mounted on the substructure of the vehicle seat. In one possible embodiment, the bearing parts of the rotary bearing also have, in addition to their sliding surfaces for radial sliding of the rotating parts relative to each other, sliding surfaces which cooperate with each other in the axial direction and which specifically transfer the forces acting on the frame from the inner bearing part to the outer bearing part so that these forces can be transferred into the substructure.

According to a preferred embodiment of the frame, the rotary bearing is disposed on the fastening section in the middle between the supporting side members or laterally offset toward one of the supporting side members. A rotary bearing disposed in the middle between the supporting side members, and whose rotational axis coincides, in particular, with the center axis of the seat back section, allows uniform distribution of force onto the rotary bearing, especially when any forces acting on the frame are transferred into the substructure. An alternative design of the frame with a rotary bearing disposed off-center causes the rotational axis to be laterally offset in relation to the center axis of the seat back section. With such an offset rotary bearing, the seat is pivoted instead about the rotational axis of the rotary bearing. Due to this off-center pivoting, the frame with the seat section preferably folded up is brought into a position close to a vehicle wall. By the variant according to the invention, the utilization of space inside the vehicle is further improved, as vehicle seats which are not needed can be positioned in a space-saving manner inside the vehicle interior.

In one possible variant, the supporting side members and/or load-bearing side members have a profile height and a profile width, the ratio of the profile height to the profile width along at least a portion of the support and/or load-bearing side members being in a range from about 5:1 to about 10:1. Within the specified ratio, a supporting and/or load-bearing side member has an area moment of inertia that is sufficiently large in relation to its profile height. In the event of an accident, a force acting on a side member of the frame can be safely absorbed and transferred toward a substructure that can be coupled to the frame.

In one possible embodiment of the frame according to the invention, the supporting side members on the seat back section have a profile width ranging from 15 to 35 mm and a profile height of 50 to 100 mm. The load-bearing side members of the seat section preferably have a profile width similar to that of the supporting side members, but have a profile height in an approximate range of 50 to 150 mm along a portion of the load-bearing side members.

The load-bearing side members preferably taper in height in a wedge-shaped manner from their first end toward their second end, the profile height at the first end preferably being at least twice as much as the profile height at the second end. Each load-bearing side member has its greatest profile height in the region where it is connected to the supporting side member. The connection region has a length which is in a ratio of at least 1:6 to about 1:5 to the total length of the supporting side member on the frame. This results in sufficiently great strength in the connection region between the load-bearing side members and the supporting side members, which preferably form a butt joint with each other. More particularly, the abutting surfaces are connected to each other in a material fit, in particular by welding them to each other. Due to the decreasing load, the greater the distance in the direction of the second end between the load-bearing side member and the connection region, the smaller the profile height that can be selected at the load-bearing side members.

Portions of the load-bearing side members are preferably cut off at the top of the load-bearing side members to produce the wedge shape, thus forming a profile that is at least partially open to the top. By cutting off the profile obliquely, it is possible to adjust its profile height in a simple manner to the load acting on the load-bearing side members.

According to a preferred development of the invention, the supporting side members have a decreasing profile height toward their top end. In particular, the supporting side members have a decreasing profile height along their last upper third as seen in the longitudinal direction. This allows the weight of the frame to be further reduced without any loss of strength or structural integrity occurring in such an adapted frame, in particular in its supporting side members. The profile height preferably decreases in the top third of the supporting side members to about half the total height of the profile.

The load-bearing cross-members extending transversely, in particular, to the load-bearing side members have a rectangular profile, the underside of the load-bearing cross-members preferably projecting at the lower edge of the load-bearing side members of the seat section. The undersides, in particular, of the load-bearing side members serve as a mounting area for a frame which can be mounted on a substructure. One of the load-bearing cross-members is preferably disposed at its ends at the second end of the load-bearing side members to be connected to each other, i.e., at the front end of the seat section. The other load-bearing cross-member is securely connected at its end, in particular to regions at the first end of the load-bearing side member and also to regions or portions of the supporting side members extending over its entire height. More particularly, the load-bearing cross-members made of the extruded profiles with a rectangular cross-section are connected at all their peripheral edges to the abutting regions of the load-bearing side members and/or supporting side members, in particular by being welded to them.

According to a development of the invention, the frame has an upper cross-member connecting the supporting side members to each other at their top ends. The upper cross-member stiffens the frame even more, which advantageously affects the strength and structural integrity of the frame. The upper cross-member connecting the supporting side members has at least one middle portion extending substantially horizontally when the seat is in operation. The upper cross-member forms, in particular, the top end of the frame and thus limits the height of the vehicle seat back serving as a support for an occupant to be transported.

According to a preferred variant of the invention, the upper cross-member is in one piece and is curved at least in portions along its longitudinal axis. The upper cross-member preferably has a middle portion that extends preferably horizontally when the seat is in operation. The upper cross-member has two end portions adjoining the middle region and which extend at an angle to the middle portion. The end portions are connected directly to the top ends of the supporting side members on the seat back section. In one embodiment of the frame, the width of the upper cross-member is the same as the profile height of the supporting side members to be connected to the end portions of the upper cross-member. This produces a step-free transition from the supporting side members to the upper cross-member.

In a preferred variant, the upper cross-member is formed from solid material and has at least one recess along one portion. Using a solid material is a structurally simple way of designing the upper cross-member connecting the upper ends of the seat back section. At least one recess is provided along a portion of the upper cross-member, which reduces the weight of the upper cross-member but does not affect the strength of the upper cross-member and thus of the entire frame.

The upper cross-member preferably has a plurality of preferably slot-shaped recesses for a belt of a belt system to pass through, or for receiving a head restraint. At least some of the recesses formed in the upper cross-member have an additional function that can be implemented by the frame according to the invention, namely at least the function of guiding a safety belt through regions of the frame. With the frame embodied according to the invention and made of aluminum or an aluminum alloy, any force exerted by a person on the belt in an accident situation and passed on to the frame can be safely absorbed and transferred into the vehicle structure bearing the frame. A slot-shaped recess through which a safety belt can be passed is preferably formed in each end portion of the upper cross-member. By this means, the seatbelt guide on a vehicle seat fitted with such a frame can be changed according to the position of the vehicle seat in the vehicle.

According to a preferred development of the invention, a holder for fastening a belt retractor of a belt system is disposed on at least one of the supporting side members on its inner side facing the other supporting side member. In addition to a belt of a belt system being passed through it, the frame according to the invention is preferably also adapted to directly fasten components of the belt system. Forces acting on the belt system are transferred directly into the structure of the frame according to the invention. The rigid configuration of the seat back section and the seat section in relation to each other means that such absorption of force is possible on such a frame. Instead of fastening the belt retractor of the belt system to the vehicle structure, a frame embodied according to the invention allows at least the belt retractor to be integrated inside the seat back section and thus inside a vehicle seat designed in accordance with the invention with such a frame. In one preferred variant, the holder is embodied as a mounting plate protruding from the inner side of one of the supporting side members of the seat back section, which mounting plate is designed with a bore for a fastening member that fastens the belt retractor to the holder.

According to a possible development of the frame, a mounting point for additional parts of the belt system is formed at the bottom end of at least one supporting side member, preferably of both supporting side members. By the additional mounting points, the entire belt system can be integrated in the vehicle seat, so that when using a vehicle seat having a frame designed in this way, there is no need to provide the vehicle with fastening points for a belt system. Such a frame further improves the potential uses of a vehicle seat fitted therewith, and the complexity of design and assembly of a vehicle fitted with such a vehicle seat is also reduced.

According to a preferred variant of the frame according to the invention, the frame is designed in accordance with Regulation No. 14 of the Economic Commission for Europe of the United Nations (UN/ECE)—Uniform provisions concerning the approval of vehicles with regard to safety-belt anchorages, ISO FIX anchorage systems and ISO FIX top-tether anchorages, Supplement 1 to the 07 series of amendments, date of entry into force: Aug. 19, 2010. Said Regulation applies to anchorages for safety belts for adults on forward-facing or rearward-facing seats in vehicles of categories M and N, as defined in Annex 7 to the Consolidated Resolution on the Construction of Vehicles (R.E. 3) (document TRANS/WP.29/78/Rev.1/Amend.2, as last amended by Amend. 4). The aforementioned Regulation applies to ISO FIX anchorage systems and to anchorages for top-tether ISO FIX anchorages intended for child restraint systems installed in vehicles of category $M_1$.

The frame is also preferably designed in accordance with Regulation No. 17 of the Economic Commission for Europe of the United Nations (UN/ECE)—Uniform provisions concerning the approval of vehicles with regard to the seats, their anchorages and any head restraints, 08 series of amendments, date of entry into force: Jul. 22, 2009. The above Regulation applies to vehicles of categories M1 and N (as defined in Annex 7 to the Consolidated Resolution on the Construction of Vehicles (R.E. 3) (document TRANS/WP.29/78/Rev.1/Amend.2, as last amended by Amend. 4)) with regard to the strength of seats and their anchorages and with regard to their head restraints. The aforementioned Regulation also applies to vehicles of categories N2 and M3 (as defined in Annex 7 to the Consolidated Resolution on the Construction of Vehicles (R.E. 3) (document TRANS/WP.29/78/Rev.1/Amend.2, as last amended by Amend. 4)) with regard to seats not covered by Regulation No. 80 in respect of the strength of seats and their anchorages, and in respect of their head restraints.

The above Regulation also applies to vehicles of category M1 with regard to the design of the rear parts of seat backs and the design of devices intended to protect the occupants from the danger resulting from the displacement of luggage in a frontal impact.

According to a second embodiment, the present invention relates to a substructure for receiving a frame for a vehicle seat, in particular a frame according to any one of the preferred embodiments described in the foregoing, and for reversibly releasably coupling to a vehicle structure. The substructure also achieves the object of the device according to the invention, in that the substructure is made at least partially or completely of aluminum or an aluminum alloy. By using aluminum or an aluminum alloy to make at least parts of the substructure, the weight of the substructure can be significantly reduced. This increases the remaining payload of a vehicle, and such a substructure allows the vehicle to be operated more energy-efficiently. At the same time, the use of aluminum or an aluminum alloy has the advantage that the substructure has high strength, which means that the safety requirements applying to such a substructure can be met. According to a preferred embodiment, the main structural parts of the substructure are made of aluminum or an aluminum alloy. An aluminum-magnesium alloy, for example, in particular ALMG 6082, is used to form the substructure.

According to a preferred development, the substructure has at least one mounting interface which can be brought into operative connection with the frame, preferably with the load-bearing cross-members of the frame. The mounting interface provided on the substructure simplifies mounting the frame on the substructure. The substructure preferably has a plurality of fastening members to match receptacles provided on the frame for receiving the fastening members. More particularly, the fastening members of the mounting interface of the substructure cooperate with the load-bearing cross-members on the frame. The mounting interface itself has at least two retaining struts extending transversely to the load-bearing cross-members of the frame when the frame is mounted and which serve as supports for the frame on the substructure. The retaining struts of the mounting interface extend parallel to one another and when the frame is mounted on the substructure they run parallel to the load-bearing side members on the seat section of the frame. In particular, two fastening members for fastening the two load-bearing cross-members of the frame are provided on each retaining strut of the mounting interface.

According to a development of the substructure, the latter has a plurality, in particular four, supporting struts each connected by a first end to the mounting interface and each having respective anchoring means at their opposite ends for coupling and decoupling the substructure to and from the vehicle structure. By the plurality of supporting struts, forces are transferred into the substructure of the vehicle structure holding the seat. The supporting struts preferably extend obliquely outward from their first ends coupled to the mounting interface, such that the distance between at least two adjacent supporting struts increases toward their second ends. In one variant, four supporting struts are provided which may be in the form of extruded profiles and be curved at least in portions along their longitudinal axis. The anchoring means on the opposite ends of the supporting struts from the mounting interface are designed to engage in and be locked into recesses formed on the vehicle structure, for example of a "Smartfloor" system floor formed on the vehicle floor. More particularly, the anchoring means have locking means and projections which are introduced or inserted into recesses in the "Smartfloor" system floor and which can be interlockingly engaged with corresponding form-locking members of the receptacles such that the substructure can be coupled to and decoupled from the vehicle structure as often as desired. The interior of the vehicle can thus be adapted individually to the respective intended use. In another embodiment, the anchoring means are securely fastened to the floor of the vehicle.

In another embodiment, a vehicle seat is provided for the transport of persons. The vehicle seat also achieves the object of the frame, in that the vehicle seat has a frame according to any one of the preferred embodiments described in the foregoing, and a substructure according to any one of the preferred embodiments described in the foregoing, and preferably a belt system fastened to the frame. With regard to the vehicle seat, reference is made to the description of the frame for its technical effects and advantages.

In yet another embodiment, the use of a frame in a vehicle seat of a motor vehicle is described, wherein the frame is formed according to any one of the preferred embodiments described in the foregoing. By using such a frame in a vehicle seat, it is possible in particular to meet the requirements applying to such a vehicle seat according to the above Regulations Nos. 14 and 17 of the Economic Commission for Europe of the United Nations (UN/ECE).

According to preferred variants in respect of the substructure, the vehicle seat or the use of such a frame, reference is made to the preferred variants of the frame according to the invention as described above. The preferred embodiments and developments described in respect of the frame according to the invention are also preferred embodiments of the substructure according to the invention, of the vehicle seat according to the invention and of the use of a frame in a vehicle seat of a motor vehicle. The preferred embodiments and developments described in respect of the substructure, the vehicle seat or the use of a frame in a vehicle seat and which refer to the frame are at the same time preferred embodiments of the frame.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one of more embodiments of the invention and, together with the general description given above and the detailed description given below, explain the one or more embodiments of the invention.

DETAILED DESCRIPTION

Figure 1:
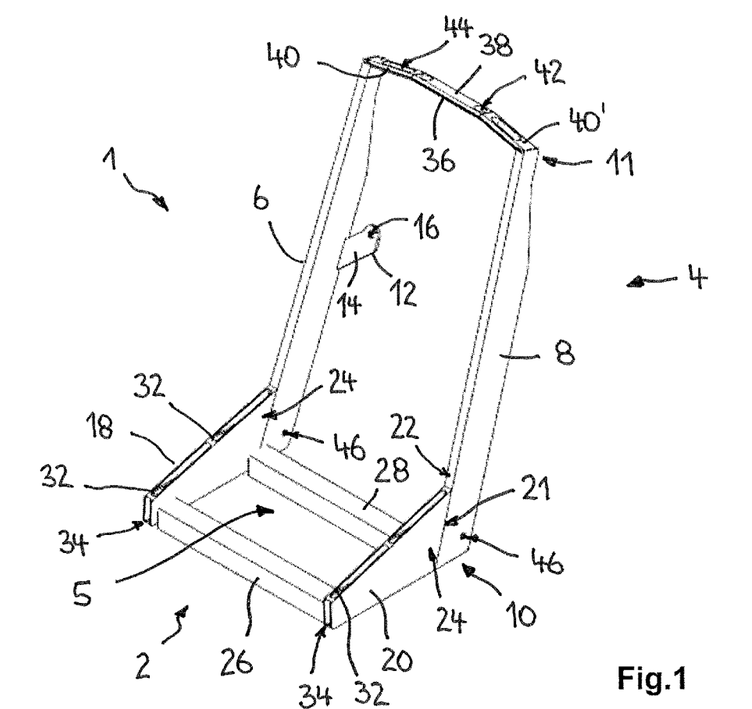
FIG. 1 shows a perspective view of a first embodiment of a frame according to the invention.

FIG. 1 shows a frame 1 that has a seat section 2 and a seat back section 4. Seat section 2 is rigidly connected to seat back section 4.

In the embodiment shown, seat section 2 and seat back section 4 are connected to each other in a material fit, such that frame 1 is integrally embodied, in particular. In one preferred embodiment, frame 1 is made of a material containing aluminum, i.e., that may be an aluminum alloy or be made entirely of aluminum. An aluminum-magnesium alloy, for example, in particular ALMG 6082, is used to form frame 1.

Figure 2:
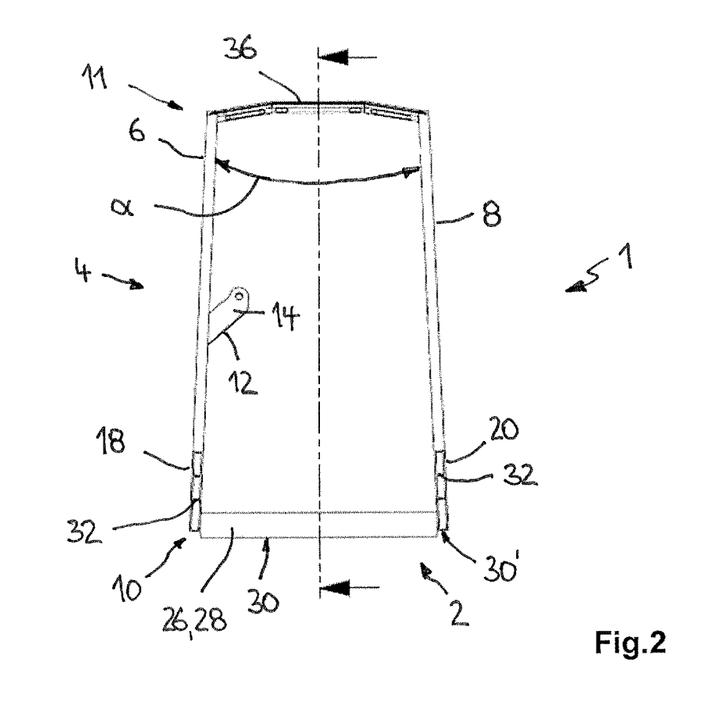
FIG. 2 shows a front view of the frame shown in FIG. 1.

Seat back section 4 has two supporting side members 6, 8 arranged at a distance from each other and defining the width of seat back section 4. In the present embodiment, and as shown in FIG. 2, supporting side members 6, 8 extend obliquely relative to each other, with the distance from each other decreasing from their bottom end 10 toward their top end 11. Supporting side members 6, 8 form an angle α ranging between 3 and 8 degrees.

As can also be seen from FIGS. 1 and 2, a holder 12 for fastening a belt retractor 114 (FIG. 7) of a belt system 110 is disposed on supporting side member 6, on an inner side facing the other supporting side member 8. Holder 12 is embodied as a mounting plate 14 having an opening 16 for fastening belt retractor 114.

Seat section 2 includes two load-bearing side members 18, 20 spaced laterally apart from each other. Load-bearing side members 18, 20 define the width of seat section 2. Load-bearing side members 18, 20 are arranged substantially parallel to each other. As can be seen from FIG. 2, load-bearing side members 18, 20 are inclined, in the direction of their height $H_T$, in the same way as the obliquely extending supporting side members 6, 8 of seat back section 4. This produces a step-free transition in connection region 21 between the load-bearing side members 18, 20 of seat section 2 and the supporting side members 6, 8 of seat back section 4.

Figure 3:
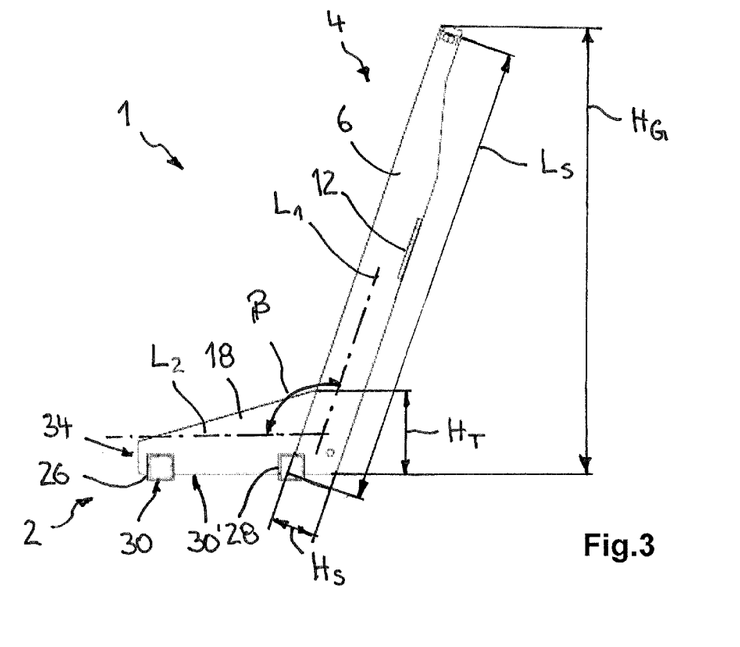
FIG. 3 shows a side view of the frame in FIG. 1, in cross-section A as shown in FIG. 2.

As can be seen from FIG. 3, supporting side members 6, 8 and load-bearing side members 18, 20 have longitudinal axes $L_1$, $L_2$, with longitudinal axes $L_1$, $L_2$ being at an angle R of about 100 degrees to 115 degrees to each other. Supporting side members 6, 8 and load-bearing side members 18, 20 thus extend at an obtuse angle to each other. Longitudinal axis $L_2$ of load-bearing side member 18, 20 is substantially horizontal when a vehicle seat 100 fitted with a frame 1 is in operation.

In the embodiment shown, supporting side members 6, 8 of seat back section 4 extend over almost the entire height $H_G$ of frame 1. Supporting side members 6, 8 are connected, in particular, at their bottom ends 10 along a portion of their longitudinal side 22 to a first end 24 of load-bearing side member 18, 20. The first ends 24 of load-bearing side members 18, 20 form a butt joint with the longitudinal sides 22 of a respective supporting side member 6, 8. More particularly, the first end 24 of load-bearing side members 18, 20 is butt welded to the corresponding longitudinal side 22 of supporting side members 6, 8.

Figure 4:
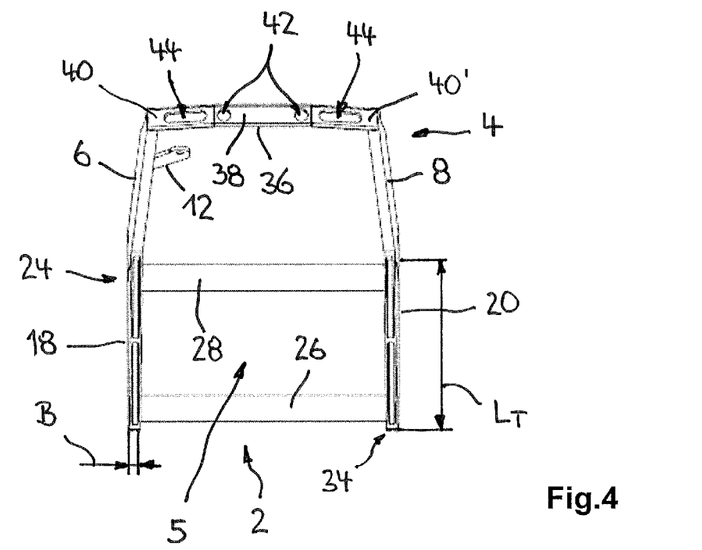
FIG. 4 shows a top view of the inventive frame shown in FIG. 1.

As can also be seen from FIGS. 1 and 4, seat section 2 has load-bearing cross-members 26, 28 extending transversely to and between load-bearing side members 18, 20. Load-bearing cross-members 26, 28 are connected likewise at their ends in a material fit to the inner facing sides of load-bearing side members 18, 20. In a preferred embodiment, load-bearing cross-member 28 is also connected to regions of the bottom ends 10 of the supporting side members 6, 8 immediately adjacent to load-bearing side members 18, 20.

As shown in FIG. 4, load-bearing cross-members 26, 28 are disposed on the load-bearing side members 18, 20 on seat section 2 in such a way that they protrude with their underside 30 at the lower edges 30' of load-bearing side members 18, 20. In the embodiment shown in the Figures, the load-bearing cross-members form a fastening section 5 for the frame.

In a preferred embodiment, supporting side members 6, 8, load-bearing side members 18, 20 and/or load-bearing cross-members 26, 28 are each formed from extruded profiles. At least supporting side members 6, 8 and/or load-bearing side members 18, 20 also have at least one stiffening web 32 extending inside the profile to form a multi-chamber profile. Supporting side members 6, 8 and load-bearing side members 18, 20 each have stiffening webs 32 inside the profile that are oriented parallel to longitudinal axes $L_1$, $L_2$.

As can be seen from FIG. 3, supporting side members 6, 8 and/or load-bearing side members 18, 20 have a profile height $H_S$, $H_T$, the ratio of profile height $H_S$, $H_T$ to the profile width along at least a portion of the supporting and/or load-bearing side member 6, 8, 18, 20 being in a range from about 5:1 to about 10:1. More particularly, supporting side members 6, 8 on frame 1 have a length $L_S$ ranging from about 650 mm to about 800 mm.

Supporting side members 6, 8 have a maximum profile height $H_S$ in the range from 100 mm to about 200 mm, particularly preferably of about 150 mm. Load-bearing side members 18, 20 have a maximum profile height $H_T$ in the range from about 150 mm to about 250 mm, particularly preferably of about 200 mm.

In particular, as can be seen from FIG. 4, load-bearing side members 18, 20 on frame 1 have a length $L_T$ of about 200 mm to about 400 mm. Supporting and/or load-bearing side members 6, 8, 18, 20 have a constant profile width B in the range from about 15 to 35 mm.

As can be seen from FIG. 3, load-bearing side members 18, 20 taper in a wedge-shaped manner from their first end 24, where they are connected to supporting side members 6, 8, toward their second end 34. In particular, the profile height $H_T$ at the first end 24 is at least twice as much as the profile height $H_T$ at the second end 34.

To produce the wedge shape on load-bearing side members 18, 20, portions of load-bearing side members 18, 20 are cut off from their top side, in particular, with the result that at least some of the chambers of the multi-chamber profile are open.

As is also shown by FIG. 3, supporting side members 6, 8 have a decreasing profile height $H_S$ along about a third of their total length toward their top end.

The top ends 11 of supporting side members 6, 8 are connected to each other by an upper cross-member 36. More particularly, upper cross-member 36 has a length that is substantially the same as the distance between the outer walls, facing away from each other, of the supporting side members 6, 8 formed as extruded profiles. Upper cross-member 36 has at least one middle portion 38 extending substantially horizontally when the seat is in operation. In the embodiment shown here, upper cross-member 36 is formed from solid material.

Upper cross-member 36 has two end portions 40, 40' extending at an angle on either side of middle portion 38. As shown in FIG. 4, there is also at least one recess 42, 44 in upper cross-member 36. The middle portion 38 of the upper cross-member has two recesses 42 in the form of circular through holes. In each end portion 40, 40' of upper cross-member 36, there are also slot-shaped recesses 44 through which a belt 112 of a belt system 110 (FIG. 7, 8) can be passed.

Upper cross-member 36 thus forms a force transmission point for the belt system that restrains a person sitting on the vehicle seat. Frame 1, in particular the top ends 10 of supporting side members 6, 8, each have a mounting point 46 for additional parts of belt system 110 to be mounted on frame 1.

Figure 5:
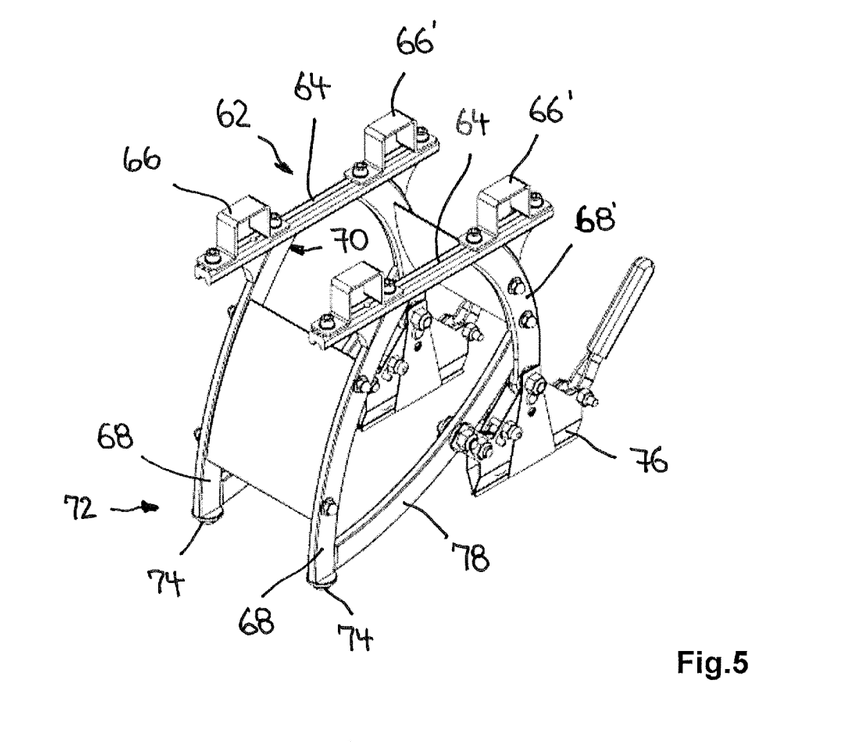
FIG. 5 shows a perspective view of a substructure for receiving the frame shown in FIG. 1.
Figure 6:
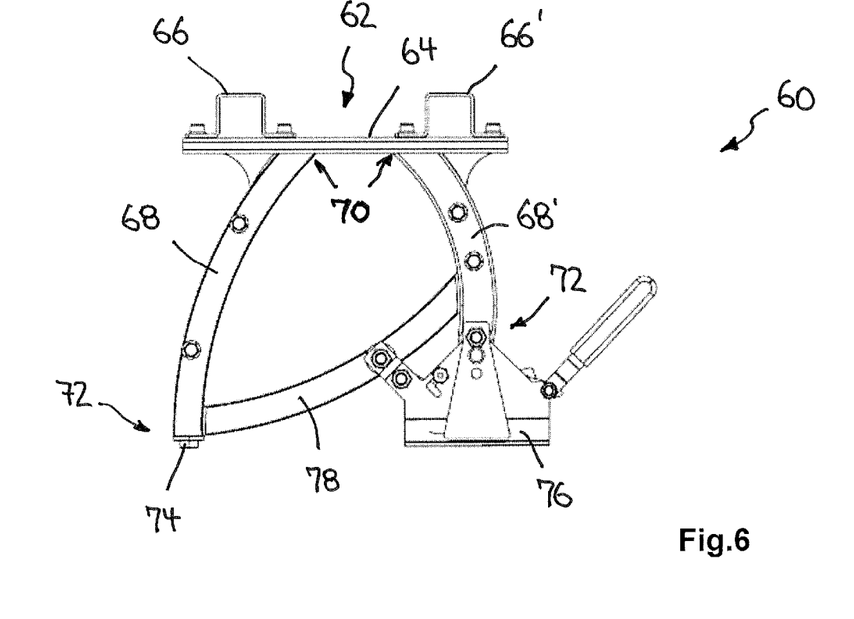
FIG. 6 shows a side view of the inventive substructure shown in FIG. 5.

FIGS. 5 and 6 show a substructure 60 that can be coupled to frame 1 and which is adapted to receive frame 1 and to couple reversibly releasably to a vehicle structure which is not shown in any further detail. Substructure 60 has a mounting interface 62 for fastening frame 1, in particular load-bearing cross-members 26, 28, to substructure 60. Mounting interface 62 comprises two retaining struts 64 as supports for the load-bearing cross-members 26, 28 of frame 1 to be placed thereon. More particularly, the retaining struts 64 of substructure 60 extend transversely to the load-bearing cross-members 26, 28 of frame 1. In order to fasten load-bearing cross-members 26, 28 to retaining struts 64, mounting interface 62 has two attachment brackets 66, 66' on each retaining strut 64. Alternatively, mounting interface 62 on substructure 60 is designed to receive a rotary bearing 56 shown in the second embodiment of frame 1' in FIGS. 9 to 13.

Substructure 60 further comprises a plurality of supporting struts 68, each connected by a first end 70 to mounting interface 62 and each having respective anchoring means 74, 76 at their opposite end 72 for coupling and decoupling substructure 60 to and from a vehicle structure which is not shown in any further detail.

In the embodiment shown here, a further coupling strut 78 preferably extends between supporting struts 68, 68'. Coupling strut 78 stiffens substructure 60, in particular near the second ends 72 of supporting struts 68, 68' that have anchoring means 74, 76.

The anchoring means 74, 76 disposed at second ends 72 are adapted to couple substructure 60, in particular in a form-fitting or force-fitting manner, to respective receptacles provided for this purpose on the vehicle structure and which are not shown in more detail. This allows the vehicle seat to be individually positioned above the vehicle structure or even allows a vehicle seat to be completely removed from the interior of a vehicle.

Figure 7:
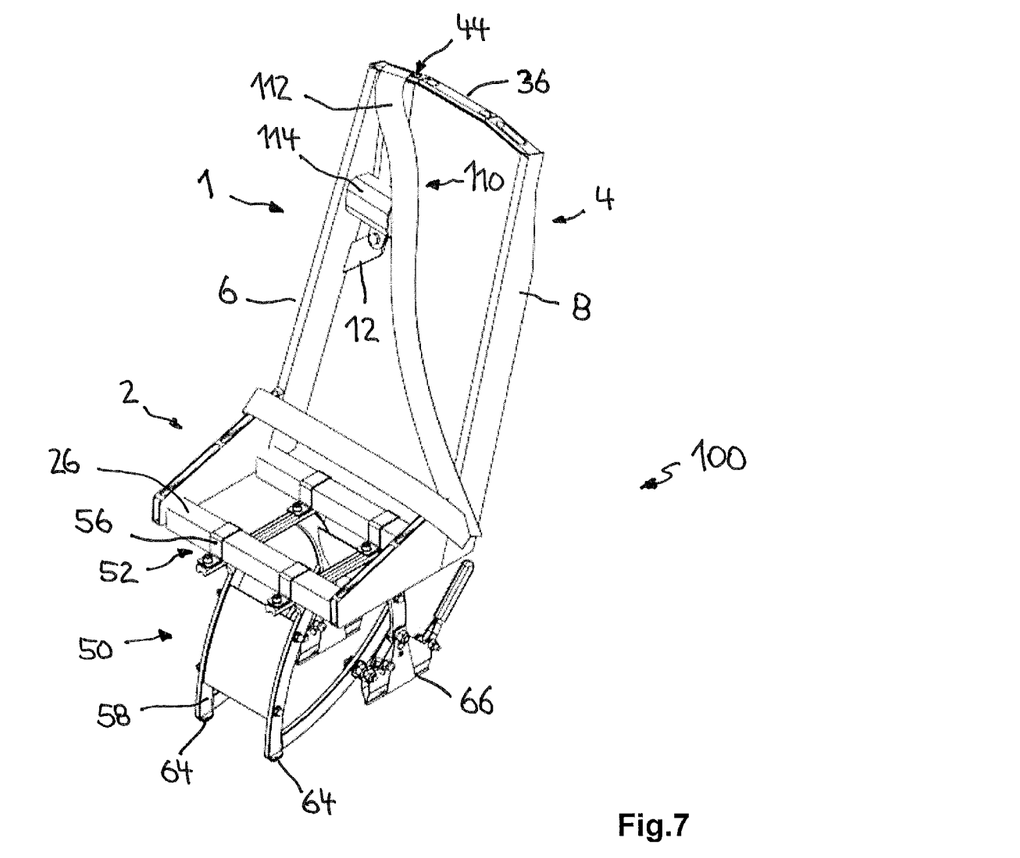
FIG. 7 shows a schematic three-dimensional view of a vehicle seat according to embodiments of the invention.
Figure 8:
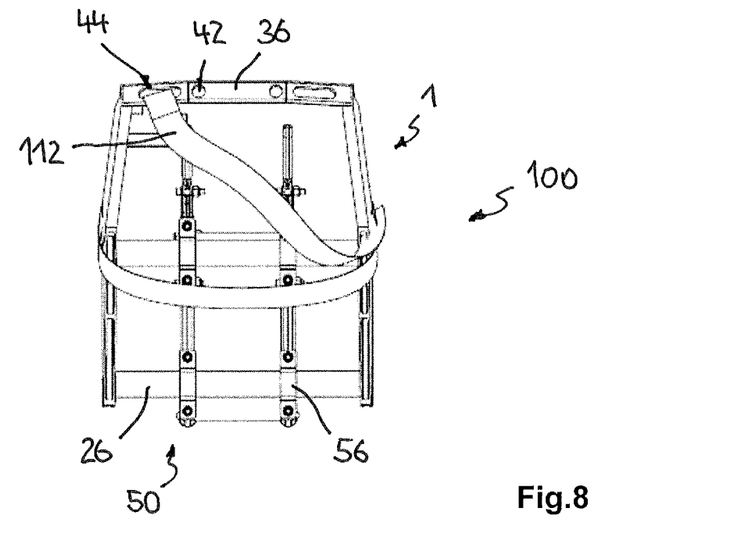
FIG. 8 shows a top view of a vehicle seat as shown in FIG. 7.

FIGS. 7 and 8 show in schematic form a vehicle seat 100 for transporting persons, which is shown here without the padding and fabric parts typical of a vehicle seat in order to better illustrate the invention. Vehicle seat 100 comprises a frame 1 and a substructure 60 which couples frame 1 to the vehicle structure, according to the preferred embodiments described above.

A belt system 110 comprising a belt 112 and a belt retractor 114 is also integrated in the vehicle seat. To show the invention clearly, the other components of belt system 110, such as the belt buckle or the end fitting that anchors the one end of belt 112, are not shown in greater detail. The belt buckle and the end fitting are fastened to the frame 1 of vehicle seat 100 via mounting points 46.

As can also be seen from FIG. 7, belt retractor 114 is fastened at the holder 12 embodied as a mounting plate 14 inside the seat back section 4 of frame 1. Belt 112 is guided out of the interior of vehicle seat 100 via recess 44 on upper cross-member 36.

Figure 9:
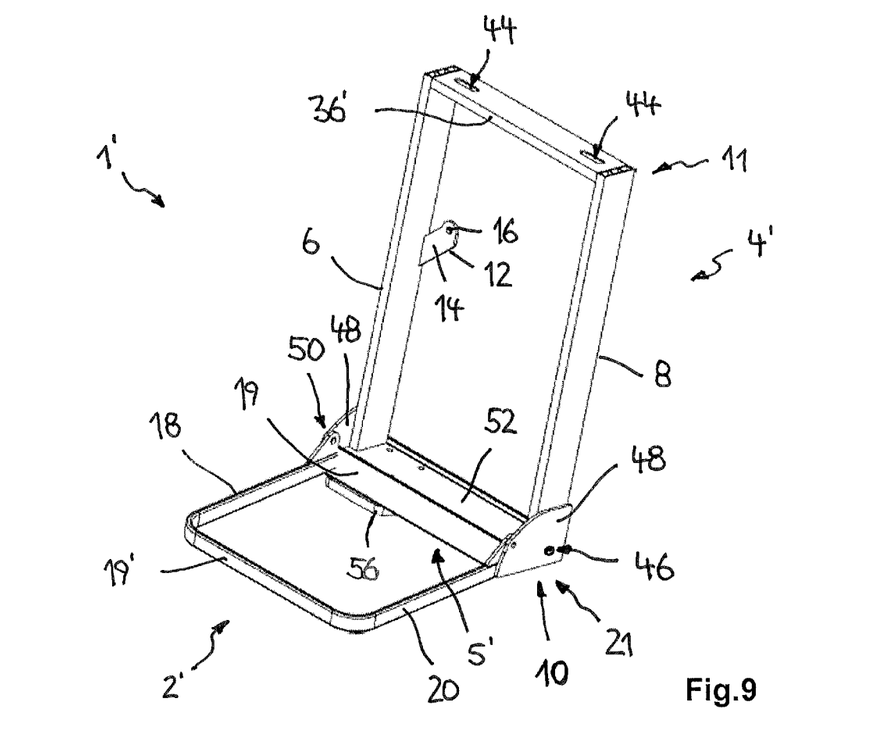
FIG. 9 shows a perspective view of a second embodiment of a frame according to the invention.

FIG. 9 shows a second embodiment of a frame 1' that has a seat section 2' and a seat back section 4'. Seat section 2' and seat back section 4' are connected to a fastening section 5' of frame 1. Fastening section 5' is used to couple frame 1, for example to a substructure 60 shown in FIG. 5, in particular to its mounting interface 62. In the embodiment shown here, seat back section 4' is rigidly connected to fastening section 5'. More particularly, seat back section 4' is formed integrally with fastening section 5'. Seat back section 4' and fastening section 5' are connected to each other in a material fit.

Unlike the variant shown in FIGS. 1 to 4, seat section 2' is movably disposed on fastening section 5'. More particularly, the ends of load-bearing side members 18, 20 on seat section 2' facing seat back section 4' each form, in conjunction with two stiffening plates 48 forming connection region 21, a pivot bearing 50 for moving seat section 2' about a pivot axis 51 relative to seat back section 4'. Seat section 2', with its load-bearing side members 18, 20 and the connecting cross-members 19, 19' connecting the ends of load-bearing side members 18, 20 to each other, forms a substantially rectangular frame part.

Seat back section 4' has two supporting side members 6, 8 that are arranged at a distance from other and which extend parallel to each other in the embodiment shown here. As can be seen from FIG. 9, a holder 12 for fastening a belt retractor 114 (FIG. 7) of a belt system 110, not shown in further detail, is disposed on an inner side of supporting side member 6.

Figure 10:
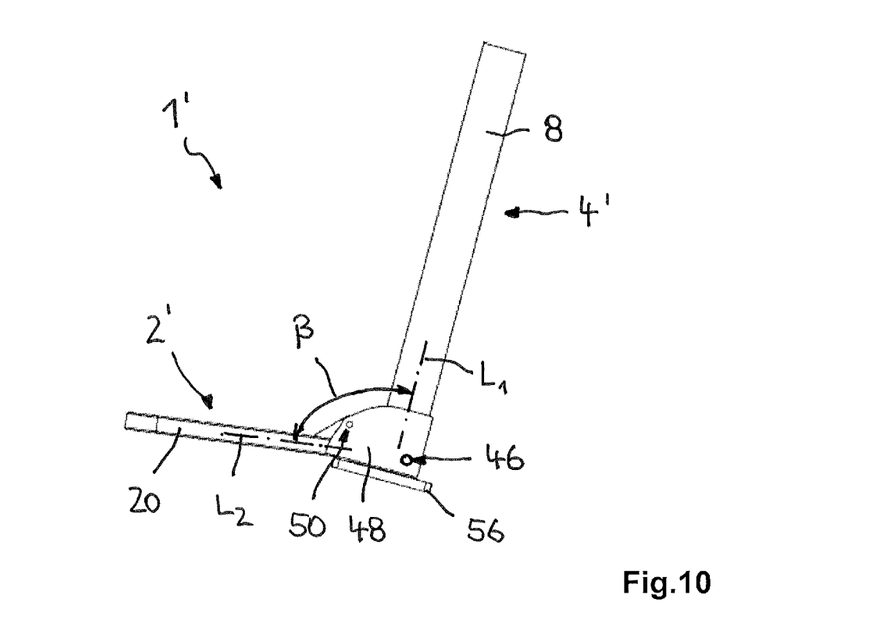
FIG. 10 shows a side view of the frame shown in FIG. 9.

As shown by FIG. 19, supporting side members and load-bearing side members 18, 20 have longitudinal axes $L_1$, $L_2$ extending at an angle R of about 100° to 115° to each other. An obtuse angle is formed between supporting side members 6, 8 and load-bearing side members 18, 20.

In the present embodiment, fastening section 5' is formed by a horizontally extending profile member 52 which is adapted to cooperate with a mounting interface 62 of a substructure 60. Supporting side members 6, 8 of seat back section 4' may be connected to the top side of profile member 52 or may extend as far as the underside of profile member.

Supporting side members 6, 8, load-bearing side members 18, 20, connecting cross-members 19, 19' and profile members 52 may each be formed from extruded profiles. Each extruded profile may also have a stiffening web extending inside the profile to form a multi-chamber profile.

Figure 11:
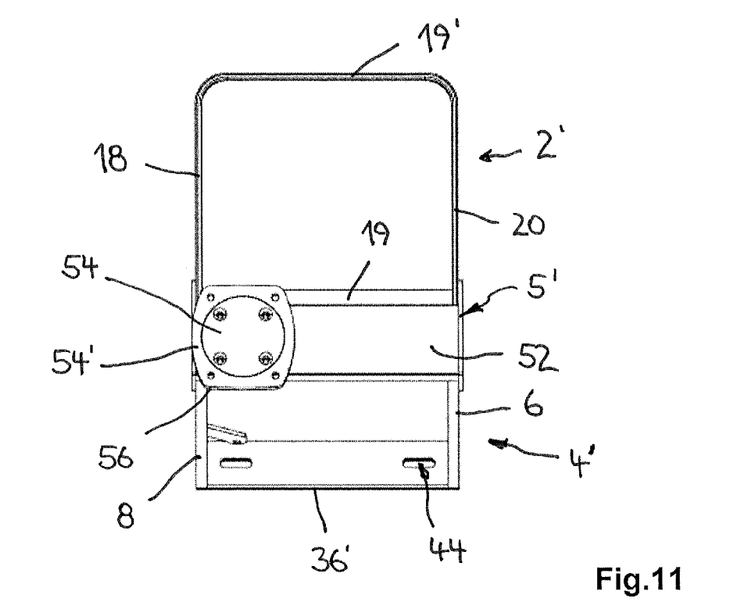
FIG. 11 shows a view of the frame in FIG. 9 from its underside.

FIG. 11 shows frame 1' according to the invention in a view from below. A rotary bearing 56 composed of two bearing parts 54 is disposed on its underside, in particular on the underside of profile member 52. Rotary bearing 56 is adapted to move frame 1' about a rotational axis 57 extending parallel to supporting side members 6, 8'. In a preferred embodiment, rotary bearing 56 is used to fasten frame 1' to substructure 60. Outer bearing part 54', in particular, is adapted to cooperate with a mounting interface 62 on substructure 60. Outer bearing part 54' is preferably screw-fastened to mounting interface 62.

As FIG. 11 shows, rotary bearing 56 is disposed off-center on profiled member 52 and in relation to supporting side members 6, 8. Rotary bearing 56 is disposed, more particularly, at one end of profile member 52 associated with supporting side member 6, 8.

The top ends 11 of supporting side members 6, 8 are connected to each other by an upper cross-member 36'. Upper cross-member 36 extends substantially horizontally when the seat is in operation. Upper cross-member 36' has a plurality of slot-shaped recesses 44 for passing through a belt 112 of a belt system, as shown in FIG. 7.

Figure 12:
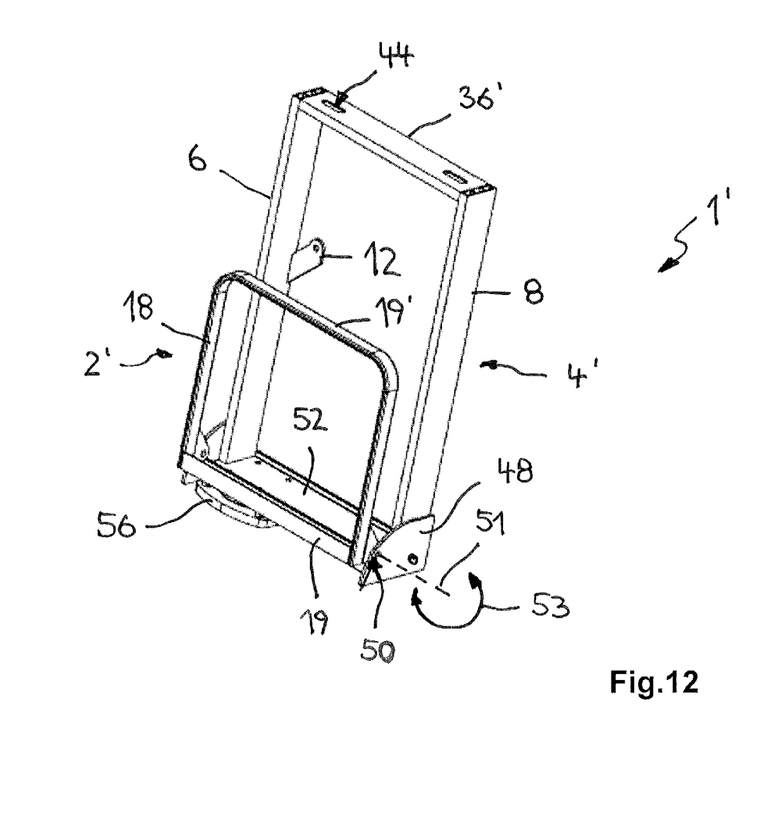
FIG. 12 shows a perspective view of the frame in FIG. 9, with its seat section pivoted upward.

As clearly shown in FIG. 12, seat section 2' is designed to pivot about pivot axis 51 to fastening section 5 and thus to seat back 4'. In its top pivoted position, shown in FIG. 12, seat section 2' extends substantially parallel to seat back section 4'. As indicated by double arrow 53, seat section 2' can be pivoted back and forth at will from the position shown in FIG. 12 into the position shown in FIG. 10 in order to use the seat in the intended manner.

Figure 13:
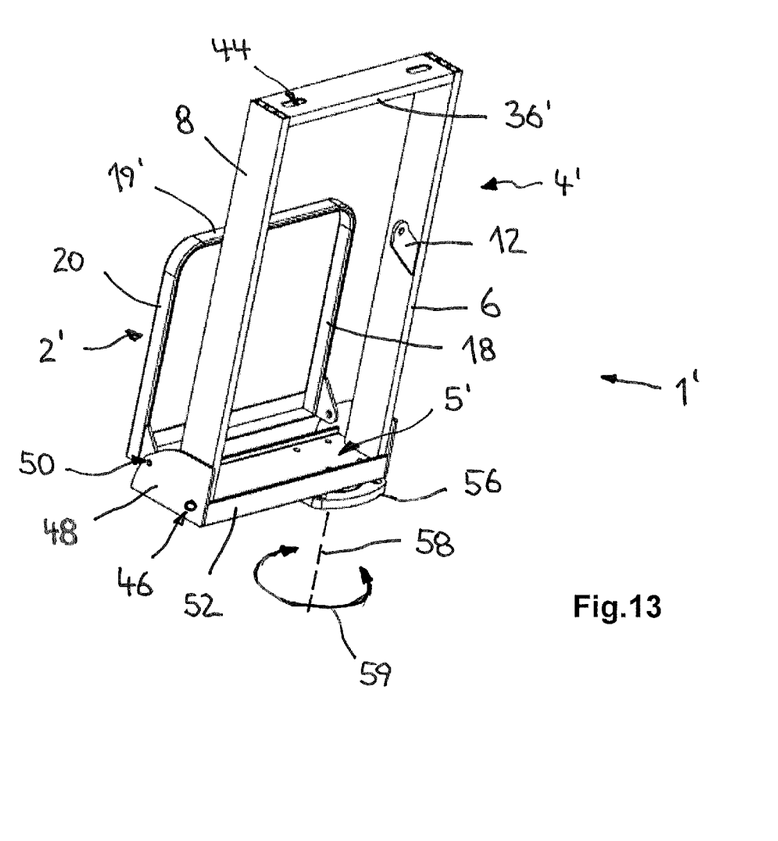
FIG. 13 shows a perspective view of the frame in FIG. 9, which has been moved about its rotary bearing.

As can be seen from FIG. 13, rotary bearing 56 has a rotational axis 58 running parallel, in particular, to the longitudinal axis $L_1$ of supporting side members 6, 8 of frame 1'. As also indicated by double arrow 59 shown in FIG. 13, it is possible by rotary bearing 56 to move frame 1' and thus the entire seat pan of vehicle seat 100 into a transport position from a normal position facing in the direction of travel and to return it again to the normal position. To do so, frame 1 with seat section 2' folded up is moved approximately 90° about rotational axis 58.

In the connection region 21 of supporting side members 6, 8 with fastening section 5', in particular on each of stiffening plates 48, frame 1' has a mounting point 46 for additional parts of a belt system 110 to be mounted on frame 1'. The dimensions of the supporting and load-bearing side members 6, 8, 18, 20 according to the second embodiment are identical, or at least similar, to the dimensions of the first embodiment.

Several preferred versions of the embodiments and options are now described.

The frame 1, 1' for a vehicle seat 100 described in the embodiments herein may be in particular for a vehicle seat 100 for people with a disability.

In the frame 1, 1', the seat section 2' may be designed to be movable by being pivotable relative to the fastening section 5'.

Each supporting side member 6, 8 is preferably connected at a lower end region along a longitudinal side 22 to a first end 24 of a load-bearing side member 18, 20.

When a rotary bearing 56 is disposed on the fastening section 5', the fastening section 5' is preferably designed as a coupling point for fastening the frame 1, 1' to the substructure 60.

When the load-bearing side members 18, 20 taper in height in a wedge-shaped manner from a first end 24 toward a second end 34, the profile height at the first end 24 preferably is at least twice as much as the profile height at the second end 34.

When the load-bearing cross members 26, 28 have a rectangular profile, the underside of the load-bearing cross members 26, 28 preferably projects at the lower edge of the load-bearing side members 18, 20.

When the frame 1, 1' includes an upper cross member 36, 36', the upper cross member 36, 36' has a plurality of preferably slot-shaped recesses 42, 44 for a belt 112 of a belt system 110 to pass through, or for receiving a head restraint.

When the frame 1, 1' includes a mounting point 46 for additional parts of a belt system 110, the mounting point 46 is preferably formed at a bottom end 10 of both supporting side members 6, 8.

In embodiments where the substructure 60 has at least one mounting interface 62, this mounting interface 62 is preferably brought into operative connection with the load-bearing cross members 26, 28 of the frame 1, 1'.

The substructure 60 includes preferably four supporting struts 68, 68' each connected by a first end 70 to the mounting interface 62.

In embodiments of the vehicle seat 100 of this invention, the vehicle seat 100 includes the frame 1, 1', the substructure 60, and preferably a belt system 110 attached to the frame 1, 1'.

Further embodiments of the invention include a use of a frame 1, 1' on a vehicle seat 100 of a motor vehicle, with the frame 1, 1' being formed of aluminum or an aluminum alloy and having any or all of the features described above.

The embodiments described above are only descriptions of preferred embodiments of the present invention, and are not intended to limit the scope of the present invention. Various variations and modifications can be made to the technical solution of the present invention by those of ordinary skills in the art, without departing from the design and spirit of the present invention. The variations and modifications should all fall within the scope defined by the claims of the present invention.

What is claimed is:

1. A frame for a vehicle seat that may be used for people with a disability, wherein the frame is made of aluminum or an aluminum alloy,
   wherein the frame has a seat section and a seat back section, the seat section being rigidly connected to the seat back section such that the seat back section cannot pivot relative to the seat section,
   wherein the seat back section has two supporting side members arranged at a distance from each other and the seat section has two load-bearing side members arranged at a distance from each other,
   wherein each supporting side member is connected at a lower end region along a longitudinal side to a first end of a load-bearing side member, and
   wherein the frame has a fastening section for fastening to a substructure, wherein the seat back section is formed integrally with the fastening section.

2. The frame of claim 1, wherein the supporting side members define a width of the seat back section.

3. The frame of claim 2, wherein the supporting side members extend obliquely to each other, and wherein the distance between the supporting side members decreases toward upper ends thereof.

4. The frame of claim 2, wherein the load-bearing side members define a width of the seat section.

5. The frame of claim 4, wherein at least one of:
   the load-bearing side members extends substantially parallel to each other;
   the supporting side members and the load-bearing side members have longitudinal axes that are at an angle β of about 100° to 115° to each other;
   the longitudinal axis of the load-bearing side member is substantially horizontal when the vehicle seat is in operation; and
   the seat section has load-bearing cross-members extending transversely to and between the load-bearing side members to form the fastening section.

6. The frame of claim 5, wherein the load-bearing cross-members have a rectangular profile.

7. The frame of claim 4, wherein the seat section has connecting load-bearing cross-members that connect ends of the load-bearing side members to each other.

8. The frame of claim 7, wherein at least one of:
the supporting side members of the seat back section extends over an entire height $H_G$ of the frame;
at least one of the supporting side members, the load-bearing side members, and the connecting cross-members are each formed from extruded profiles; and
at least one of the supporting side members and load-bearing side members have at least one stiffening web extending inside a profile thereof to form a multi-chamber profile.

9. The frame of claim 4, wherein at least one of the supporting side members and load-bearing side members have a profile height and a profile width, a ratio of the profile height to the profile width along at least a portion of the supporting side members and/or load-bearing side members being in a range from about 5:1 to about 10:1.

10. The frame of claim 4, wherein at least one of:
the load-bearing side members taper in height in a wedge-shaped manner from a first end toward a second end,
a profile height at the first end is at least twice as much as the profile height at the second end; and
portions of the load-bearing side members are cut off at the top of the load-bearing side members to produce a wedge shape, thus forming an at least partially open profile.

11. The frame of claim 2, wherein the supporting side members have a decreasing profile height toward their top end.

12. The frame of claim 2, wherein at least one of:
the frame has an upper cross-member connecting the supporting side members to each other at top ends thereof;
the upper cross-member is formed in one piece and is curved at least in portions along a longitudinal axis thereof;
the upper cross-member is formed from solid material and has at least one recess;
the upper cross-member has a plurality of recesses for a belt of a belt system to pass through, or for receiving a head restraint; and
the recesses are slot-shaped.

13. The frame of claim 2, further comprising:
a holder for fastening a belt retractor of a belt system, the holder that is disposed on at least one of the supporting side members on an inner side thereof facing the other supporting side member.

14. The frame of claim 2, further comprising:
a mounting point for additional parts of a belt system, the mounting point formed at a bottom end of at least one of the supporting side member(s).

15. A vehicle seat for transport of persons, comprising:
the frame of claim 1, and
a belt system arranged at the seat back section of the frame.

16. A frame for a vehicle seat that may be used for people with a disability, wherein the frame is made of aluminum or an aluminum alloy,
wherein the frame has a seat section and a seat back section, the seat section being rigidly connected to the seat back section such that the seat back section cannot pivot relative to the seat section,
wherein the seat back section has two supporting side members arranged at a distance from each other and the seat section has two load-bearing side members arranged at a distance from each other,
wherein each supporting side member is connected at a lower end region along a longitudinal side to a first end of a load-bearing side member,
wherein the supporting side members define a width of the seat back section, and
wherein the supporting side members extend obliquely to each other, and wherein the distance between the supporting side members decreases toward upper ends thereof.

17. A frame for a vehicle seat that may be used for people with a disability, wherein the frame is made of aluminum or an aluminum alloy,
wherein the frame has a seat section and a seat back section, the seat section being rigidly connected to the seat back section such that the seat back section cannot pivot relative to the seat section,
wherein the seat back section has two supporting side members arranged at a distance from each other and the seat section has two load-bearing side members arranged at a distance from each other,
wherein each supporting side member is connected at a lower end region along a longitudinal side to a first end of a load-bearing side member,
wherein the supporting side members define a width of the seat back section, and
wherein the supporting side members have a decreasing profile height toward their top end.

* * * * *